(12) United States Patent
Huang et al.

(10) Patent No.: US 7,417,357 B2
(45) Date of Patent: Aug. 26, 2008

(54) ULTRASONIC MOTOR

(75) Inventors: Ching-Hsing Huang, Guangdong (CN); Chien-Long Hong, Guangdong (CN); Huan-Chao Lin, Guangdong (CN); Wun-Chang Shih, Guangdong (CN); Hsien-Sheng Pei, Guangdong (CN)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 239 days.

(21) Appl. No.: 11/308,011

(22) Filed: Mar. 3, 2006

(65) Prior Publication Data

US 2006/0208616 A1    Sep. 21, 2006

(30) Foreign Application Priority Data

Mar. 20, 2005  (TW)  ............................. 94108394 A

(51) Int. Cl.
  *H01L 41/053*  (2006.01)
(52) U.S. Cl. .................. 310/323.02; 310/344; 310/348
(58) Field of Classification Search ................................
  310/323.01–323.21, 344, 348
  See application file for complete search history.

(56) References Cited

U.S. PATENT DOCUMENTS

| | | | |
|---|---|---|---|
| 6,450,419 B1 * | 9/2002 | Martens et al. | ........... 239/102.1 |
| 6,489,705 B1 | 12/2002 | Ouyang et al. | |
| 6,657,362 B2 | 12/2003 | Matsuo et al. | |
| 6,717,331 B1 | 4/2004 | Lan et al. | |
| 6,798,118 B1 | 9/2004 | Wen | |
| 2004/0080243 A1 | 4/2004 | Osamu | |
| 2005/0082950 A1 * | 4/2005 | Zakoji | ........................ 310/348 |
| 2005/0184621 A1 * | 8/2005 | Kitahara et al. | .............. 310/311 |
| 2006/0250048 A1 * | 11/2006 | Moteki et al. | ........... 310/323.02 |

* cited by examiner

*Primary Examiner*—Darren Schuberg
*Assistant Examiner*—Derek J Rosenau
(74) *Attorney, Agent, or Firm*—Winston Hsu

(57) ABSTRACT

An ultrasonic motor includes a rotor (70) and a piezoelectric driving unit (50) for driving the rotor to rotate. The driving unit includes a piezoelectric film (52) and a vibration film (54) contacting with the rotor at an outer-periphery thereof. The ultrasonic motor further includes covers (56, 58) having a plurality of poles (560, 580) extending therefrom. Free ends of the poles fixedly connect with top and bottom sides of the vibration film, respectively.

17 Claims, 3 Drawing Sheets

ULTRASONIC MOTOR

FIELD OF THE INVENTION

The present invention relates generally to a motor, and particularly to an ultrasonic motor having a piezoelectric element.

DESCRIPTION OF RELATED ART

To improve human life, many scientists and inventors produced many convenient devices and mechanisms. In particular, the introduction of the electromagnetic motor had brought great progress to the world. It had been invented more than one hundred years ago. Since then, the electromagnetic motors have been widely used in machine-related manufacturing industries. However, aside from new discoveries in superconductors and magnetic materials, there is not much progress in motors. It is very hard for either conventional motors or small motors to overcome the problem of power conversion rate. Therefore, a new motor driven by high power ultrasonic wave energy has received a lot of attention by the public. We call this kind of motor the ultrasonic motor.

Although this type of motors has a different mechanical structure, it is still based upon the same theory, which was proposed by V. V. Lavrinekon and P. E. Vasilievthe in the former Soviet Union. Due to the unstable structure, is had not been widely used until 1980s. After the semiconductor industry arose, a motor that is free from electromagnetic interference (EMI) and also capable of performing precision controls is needed. Such an urgent need accelerated the development of ultrasonic motors. In the past decades, the manufacturing technique for ultrasonic motors had tremendous progress.

The ultrasonic motor uses the elastic vibrations produced by ultrasonic waves to obtain the driving force. Such a driving force brings the rotor into motion by friction. An alternate voltage as a driving source is supplied to a piezoelectric ceramic to produce alternate expanding and shrinking motions. Although the expanding and shrinking scale is only a few micrometers, the frequency is hundreds of thousand times per second and thus the piezoelectric ceramic can move several centimeters per second.

Although this type of ultrasonic motors has the advantages of being quiet, efficient, small and light, it still has a problem. The piezoelectric ceramic is provided with through holes. Bolts are used to extend through these through holes to fasten the piezoelectric ceramic and other constituting parts of the ultrasonic motor together. Since the pressure exerted by the bolts to the piezoelectric ceramic is not easy to control, boundary conditions regarding expansion and shrinkage of the piezoelectric ceramic cannot be precisely set. Accordingly, vibration model of the piezoelectric ceramic cannot be easily controlled whereby unstable vibrations are generated to affect a precise operation of the motor. Such a problem needs to be solved to further improve the performance of the ultrasonic motors.

SUMMARY OF INVENTION

According to a preferred embodiment of the present invention, an ultrasonic motor comprises a rotor and a piezoelectric driving unit for driving the rotor to rotate. The piezoelectric driving unit comprises a piezoelectric film and a vibration film contacting with the rotor at an outer-periphery thereof. A cover fixedly contacts with the vibration film via a plurality of contacting portions. Thus the contacting portions of the cover and the vibration film form standing points. The contacting portions are planar shaped and the contacting area is larger. The pressure of the contacting portions is even and easy to control. The boundary condition of the ultrasonic motor is easy to control, and the motor has a better performance.

Other advantages and novel features of the present invention will be drawn from the following detailed description of a preferred embodiment of the present invention with attached drawings, in which:

DETAILED DESCRIPTION

Figure 1:
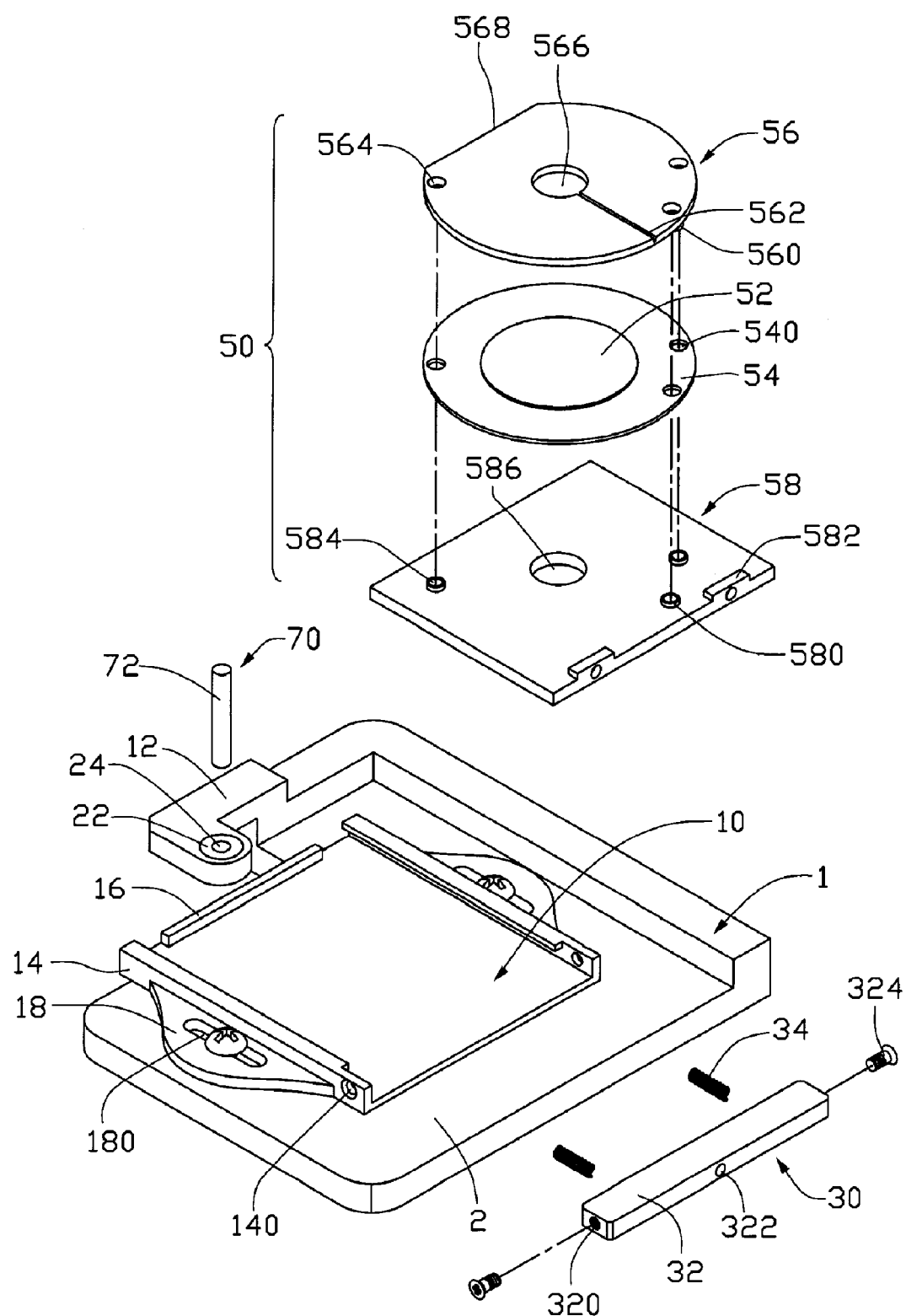
FIG. 1 is an isometric, explored view of an ultrasonic motor in accordance with a preferred embodiment of the present invention.
Figure 2:
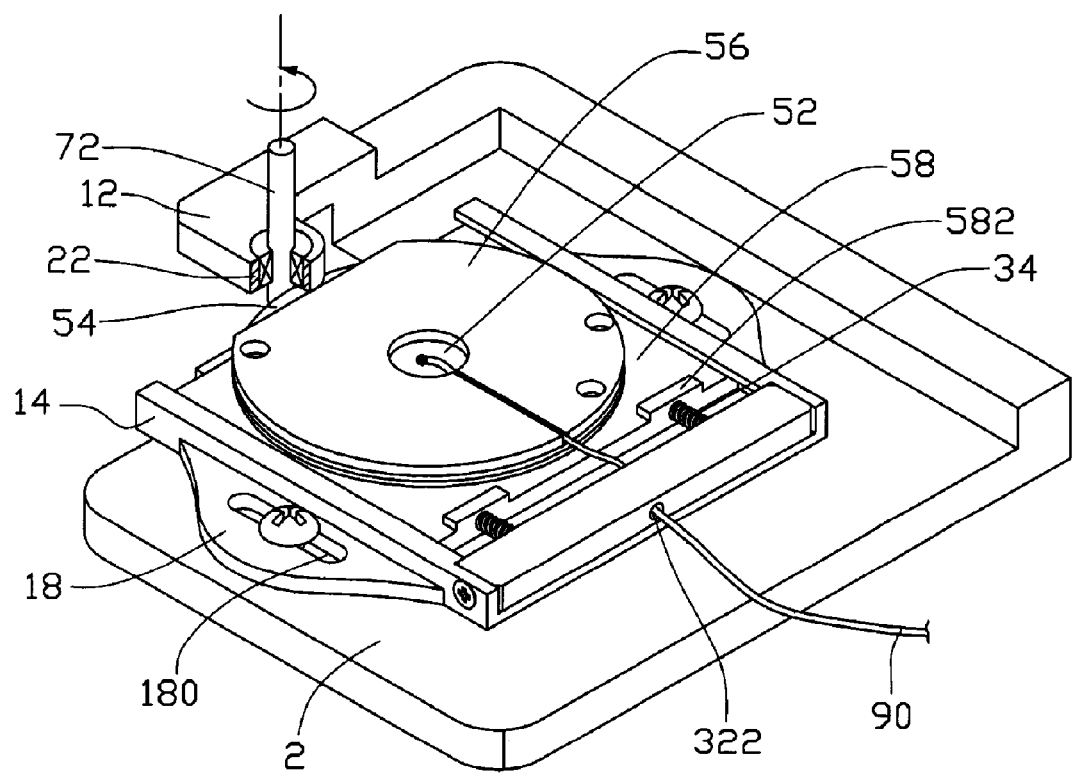
FIG. 2 is an isometric, assembled view of the ultrasonic motor of FIG. 1.

Referring to FIGS. 1-2, an ultrasonic motor according to a preferred embodiment of the present invention comprises a support unit 1, a piezoelectric driving unit 50 mounted on the support unit 1, a rotor 70 arranged at a side of the driving unit 50, and a pressure unit 30 located at another side of the driving unit 50 opposite to the rotor 70 to keep the driving unit 50 in pressure contact with the rotor 70.

The support unit 1 includes a bottom plate 2 and a base 10 located on the bottom plate 2. The bottom plate 2 forms an arm 12 at an outside of the base 10. The arm 12 defines an opening (not labeled) for receiving a bearing 22 therein. The bearing 22 defines a shaft hole 24 therein for extension of the rotor 70 therethrough. The rotor 70 includes a shaft 72 extending through the shaft hole 24 and being rotatable with respect to the bearing 22.

The base 10 is approximately square shaped. A pair of ears 18 extends outwardly from two opposite sides of the base 10, respectively. Each ear 18 defines a slot 180 therein, for securing the base 10 with the bottom plate 2. Screws (not labeled) are used to extend through the slots 180 to threadedly engage with the bottom plate 2, thereby fastening the base 10 and the bottom plate 2 together. A sidewall 14 extends upwardly from each of the two opposite sides of the base 10. A baffle 16 extends upwardly from one of other two opposite sides of the base 10, near the arm 12 of the bottom plate 2. A mounting hole 140 is defined in an end of each sidewall 14 distant from the baffle 16.

The pressure unit 30 includes a main body 32 defining two screw holes 320 in two opposite ends thereof corresponding to the mounting holes 140 of the base 10, respectively. Two screws 324 extend through the mounting holes 140 into the screw holes 320 to screw the main body 32 with the base 10. It is can be understood that the main body 32 of the pressure unit 30 can be integral formed with the base 10 of the support unit 1. A through hole 322 is defined in the main body 32 for extension of wires 90 therethrough to electrically connect the motor with a power supply (not shown). A pair of springs 34 connects between the main body 32 and the driving unit 50.

The driving unit 50 includes a circular shaped piezoelectric film 52 and an elastic vibration film 54 with a shape similar to the piezoelectric film 52 but having a larger diameter. The piezoelectric film 52 is made of piezoelectric ceramic, and the vibration film 54 is a metal. The piezoelectric film 52 is secured on the vibration film 54 by electric welding or electroplating. Thus together the piezoelectric film 52 and vibration film 54 form a buzzer. The vibration film 54 contacts the rotor 70 to driving the rotor 70 to rotate. Three circular holes 540 are defined in the vibration film 54 near an outer edge thereof. The circular holes 540 are asymmetrically arranged along a circumferential direction of the vibration film 54. Alternatively, the circular holes 540 may be symmetrically arranged along the circumferential direction of the vibration film 54.

A pair of covers 56, 58 (i.e., top and bottom covers 56, 68) is arranged at two opposite sides (i.e., upper and lower sides) of the buzzer. The top cover 56 is circular and has a diameter approximately the same as the vibration film 54, whereas the bottom cover 58 is square and is larger than the vibration film 54. Each cover 56, 58 defines a central hole 566, 586 in a central portion thereof. The wires 90 extend through the central holes 566, 586 to electrically connect the buzzer. Poles 560, 580 extend from the covers 56, 58, respectively, toward the buzzer. The poles 560, 580 are positioned corresponding to the circular holes 540 of the buzzer, respectively. The poles 560, 580 are circular-column shaped and hollow. Fixing hole 564, 584 are defined in the covers 56, 58, respectively, extending through the poles 560, 580. During assembly, fixing elements (not shown), such as bolts, screws etc., extend through the fixing holes 564, 584, the poles 560, 580 of the covers 56, 58 and the circular holes 540 of the vibration film 54 to secure the driving unit 50 together. Free ends (not labeled) of the poles 560, 580 of the covers 56, 58 form flanges (not labeled) thereon, which abut against top and bottom sides of the vibration film 54. The covers 56, 58 and the vibration film 54 have a relatively large planar contacting area by the flanges formed on the free ends of the poles 560, 580. Furthermore, pressure exerted on the top and bottom sides of the vibration film 54 is equal to each other. Thus, the pressure exerted on the piezoelectric film 52 is more evenly distributed and can be more easily controlled. The boundary conditions of the buzzer are easy to control; thus, the motion of the ultrasonic motor is smooth and precise.

A groove 562 is defined in the top cover 56 for receiving the wires 90. A linear cut 568 is defined in the top cover 56 corresponding to the contacting portion of the vibration film 54 and rotor 70. Thus the wave of the vibration film 54 at the contacting portion of the vibration film 54 and rotor 70 has the largest scale. A protrusion 582 extends from the bottom cover 58 and connects with a corresponding spring 34 of the pressure unit 30. Thus the driving unit 50 and the pressure unit 30 connect together.

During assembly, the driving unit 50 is arranged on the base 10 of the support unit 1. The sidewalls 14 of the base 10 abuts two opposite sides of the bottom cover 58, respectively. The driving unit 50 can move along the sidewalls 14 of the base 10. The pressure unit 30 connects with the base 10 at a side thereof opposite to the rotor 70. The springs 34 of the pressure unit 30 connect the pressure unit 30 and driving unit 50 together. Thus the pressure unit 30 and the baffle 16 abut another two opposite sides of the driving unit 50. Then the driving unit 50 is moveable arranged on the base 10 of the support unit 1. The wires 90 extend through the central holes 566, 586 of the covers 56, 58 and electrically connect with two opposite sides of the piezoelectric film 52. The other ends of the wires 90 electrically connect with the power supply. Thus the ultrasonic motor is assembled together.

Figure 3:
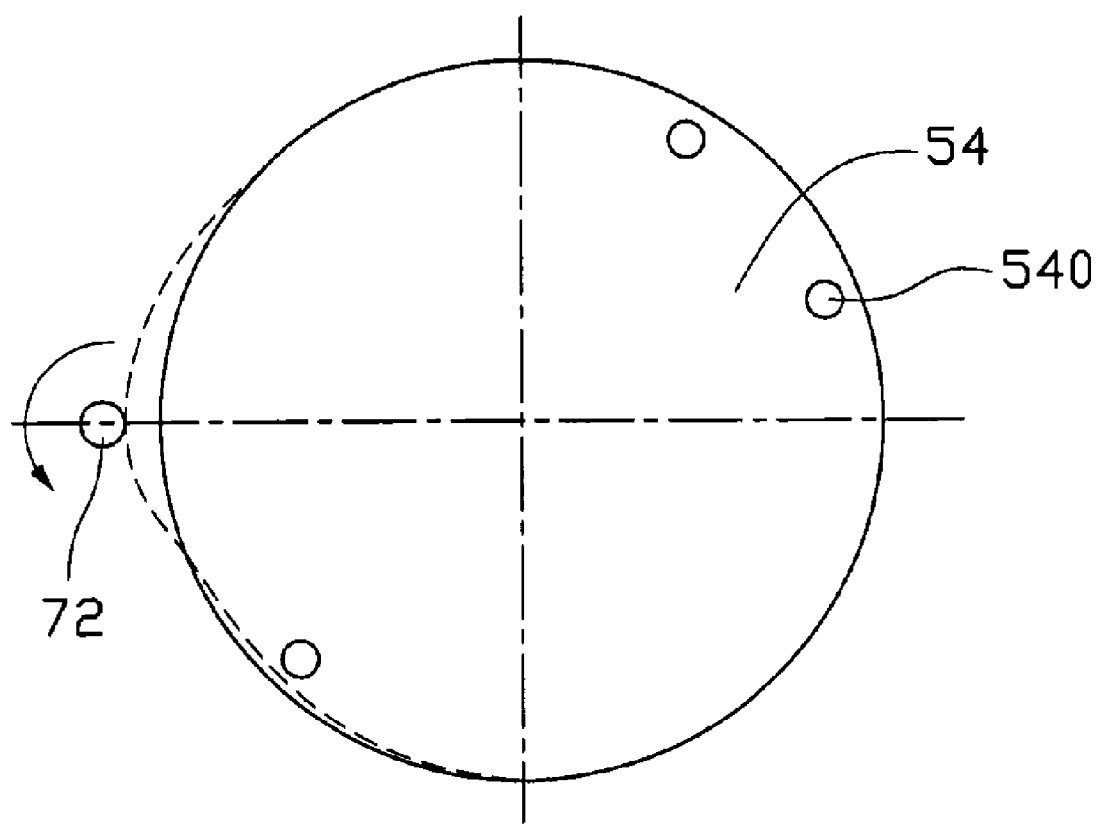
FIG. 3 shows a standing wave formed on an edge of a vibration film during operation of the ultrasonic motor.

Referring to FIG. 3, during operation of the ultrasonic motor, the power supply provides an alternate voltage to the piezoelectric film 52 via the wires 90. As a result of the reverse piezoelectric effect, the piezoelectric film 52 produces alternate expending and shrinking deformations. Then the elastic vibration film 54 generates mechanical waves that propagate along the edge of the elastic vibration film 54. Through the covers 56, 58 and the fixing elements, a standing wave thus forms on the edge of the elastic vibration film 54 to providing kinetic energy to the exterior. Then the wave energy of the deformed vibration film 54 converts into kinetic energy of the rotor 70 by friction and brings the rotor 70 into rotary motion. Contacting portions of the buzzer and the flanges of the free ends of the poles 560, 580 of the covers 56, 58 form the standing points of the standing wave. The deformation of the vibration film 54 is several micrometers in scale; the rotor 70 can be moved by several centimeters as the deformation frequency is tens of thousand times pre second. For the planar-shaped contacting portions of the buzzer and the flanges of the free ends of the poles 560, 580 of the covers 56, 58, the pressure on the three standing points can be distributed over a larger area and is thus easy to control; accordingly, the motion of the ultrasonic motor can be precisely controlled. The ultrasonic motor provides a highly precise driving force.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. An ultrasonic motor comprising:
    a support unit;
    a rotor rotatably mounted on the support unit; and
    a piezoelectric driving unit for driving the rotor to rotate, the driving unit being movably mounted on the support unit and comprising a piezoelectric film and a vibration film contacting with the rotor at an outer-periphery thereof;
    wherein the piezoelectric driving unit comprises a cover fixedly contacting with the vibration film via a plurality of contacting portions;
    wherein a plurality of poles extend from the cover and each form a flange at a free end thereof, the flanges contacting with the vibration film;
    wherein the cover comprises a top and bottom cover arranged at two opposite sides of the driving unit, respectively; and
    wherein each pole is hollow and defining a mounting hole in the covers, a circular hole is defined in the vibration film corresponding to each mounting hole of the covers, the holes being adapted for extension of fixing elements to secure the covers with the vibration film.

2. The ultrasonic motor as claimed in claim 1, wherein a cut is defined in the cover corresponding to the contacting portion of the vibration film and rotor.

3. The ultrasonic motor as claimed in claim 1, wherein the poles are asymmetrically arranged along a circumferential direction of the cover.

4. The ultrasonic motor as claimed in claim 1, wherein the poles are symmetrically arranged along a circumferential direction of the cover.

5. The ultrasonic motor as claimed in claim 1, wherein the vibration film is secured to the piezoelectric film by electric welding or electroplating.

6. An ultrasonic motor comprising:
    a support unit;
    a piezoelectric driving unit arranged on the support unit;
    a rotor located at a first side of the driving unit and driven by the piezoelectric driving unit; and
    a pressure unit located at a second side of the driving unit opposite to the first side thereof to keep the driving unit in pressure contact with the rotor;
    wherein the piezoelectric driving unit comprises a vibration film contacting with the rotor at an outer-periphery thereof, a piezoelectric film secured on the vibration film, and at least one cover contacting with the vibration film, the at least one cover having a plurality of hollow poles, each pole defining a mounting hole in the at least one cover, a circular hole being defined in the vibration film corresponding to each mounting hole of the at least one cover, the holes being adapted for extension of fixing elements to secure the at least one cover with the vibration film.

7. The ultrasonic motor as claimed in claim 6 wherein the support unit includes an arm located at an outside of the driving unit, the arm defining a shaft hole for extension of the rotor therethrough.

8. The ultrasonic motor as claimed in claim 6 wherein the pressure unit comprises at least a spring connecting with the driving unit.

9. The ultrasonic motor as claimed in claim 6 wherein a baffle extends from the support unit and abuts the first side of the driving unit.

10. The ultrasonic motor as claimed in claim 6 wherein the support unit includes two sidewalls abutting other two opposite sides of the driving unit.

11. The ultrasonic motor as claimed in claim 6 wherein the at least one cover comprises a pair of covers fixedly contact two opposite sides of the vibration film, respectively, a contacting portion of the covers and the vibration film is planar.

12. An ultrasonic motor comprising:

a support unit having a rotor rotatably mounted thereon;

a piezoelectric driving unit for driving the rotor to rotate being mounted on the support unit, comprising:

a bottom cover mounted on the support unit and having a plurality of upwardly extending poles;

a vibration film mounted on free ends of the poles of the bottom cover;

a piezoelectric film secured on the vibration film;

a top cover having a plurality of downwardly extending poles abutting against a top side of the vibration film, the poles of the top cover being located corresponding to the poles of the bottom cover and holes being defined in the poles adapted for receiving fastener to extend through the top and bottom covers and the vibration film for securely connecting the top cover, bottom cover and the vibration film and the piezoelectric film together.

13. The ultrasonic motor as claimed in claim 12 further comprising a pressure unit fixed to the support unit and connecting with the piezoelectric driving unit via an elastic member.

14. The ultrasonic motor as claimed in claim 13 wherein the elastic member is a spring interconnecting the base cover and the pressure unit.

15. The ultrasonic motor as claimed in claim 12 wherein each of the free ends of the poles has a flange abutting against the vibration film.

16. The ultrasonic motor as claimed in claim 15 wherein the top cover and the bottom cover each define a hole for extension of a wire for supply electric power to the piezoelectric film.

17. The ultrasonic motor as claimed in claim 15, wherein the top cover has a round shape with a linear cut, the linear cut being located near the rotor.

* * * * *